E. SCHNEIDER.
SPEEDOMETER.
APPLICATION FILED OCT. 29, 1907.

938,278.

Patented Oct. 26, 1909.
3 SHEETS—SHEET 1.

WITNESSES:
W. M. Avery
J. P. Davis

INVENTOR
Ernest Schneider
BY Munn & Co
ATTORNEYS

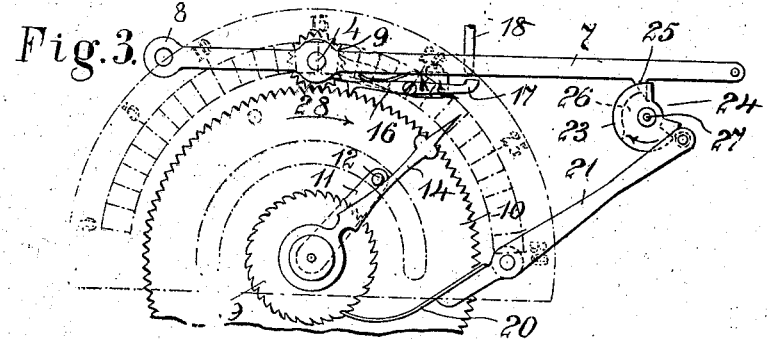

UNITED STATES PATENT OFFICE.

ERNEST SCHNEIDER, OF VIENNA, AUSTRIA-HUNGARY.

SPEEDOMETER.

938,278.

Specification of Letters Patent. Patented Oct. 26, 1909.

Application filed October 29, 1907. Serial No. 399,719.

*To all whom it may concern:*

Be it known that I, ERNEST SCHNEIDER, mechanician, a subject of the Emperor of Austria-Hungary, and a resident of Vienna, XV. Staglgasse 8, in the Empire of Austria-Hungary, have invented Improvements in or Relating to Speedometers; and I do hereby declare the following to be a full, clear, and exact description of the invention, such as will enable others skilled in the art to which it appertains to make and use the same.

The speedometer according to this invention is connected to an ordinary clock work, which couples a spindle to an indicator device intermittently for a definite period of time, so that the index of the indicator is set in accordance with the speed of the spindle at the time. For this purpose the clockwork drives with a constant speed another spindle provided with cams, by the action of which is brought about the coupling and uncoupling of the driving gear for the indicator device, as well as a complete release of the latter for the return to the zero position.

The spindle to be coupled by means of the clockwork to the indicator device, can be connected in any suitable manner to the spindle or axle the speed of which is to be measured, for instance to the axle of a motor car, locomotive or to the spindle of a knot measuring device of a ship, etc.

Figure 1:
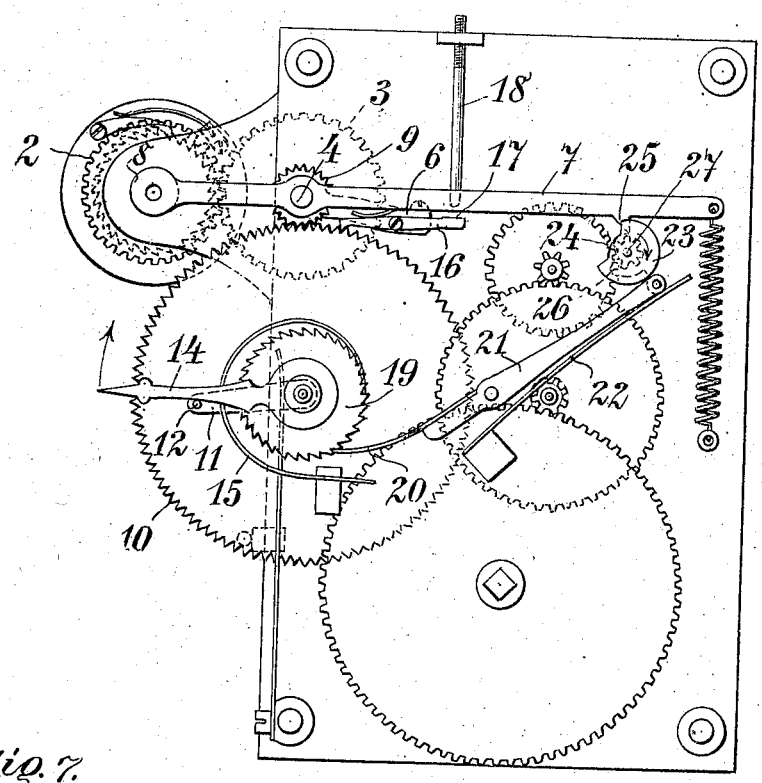
Figure 1:
Figure 1:
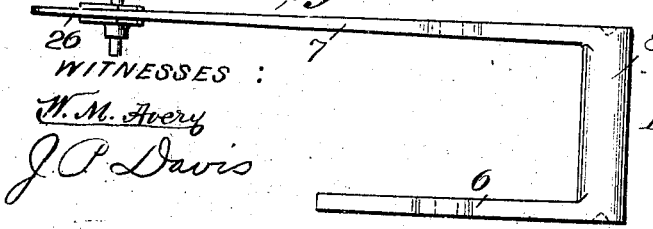
Figure 2:
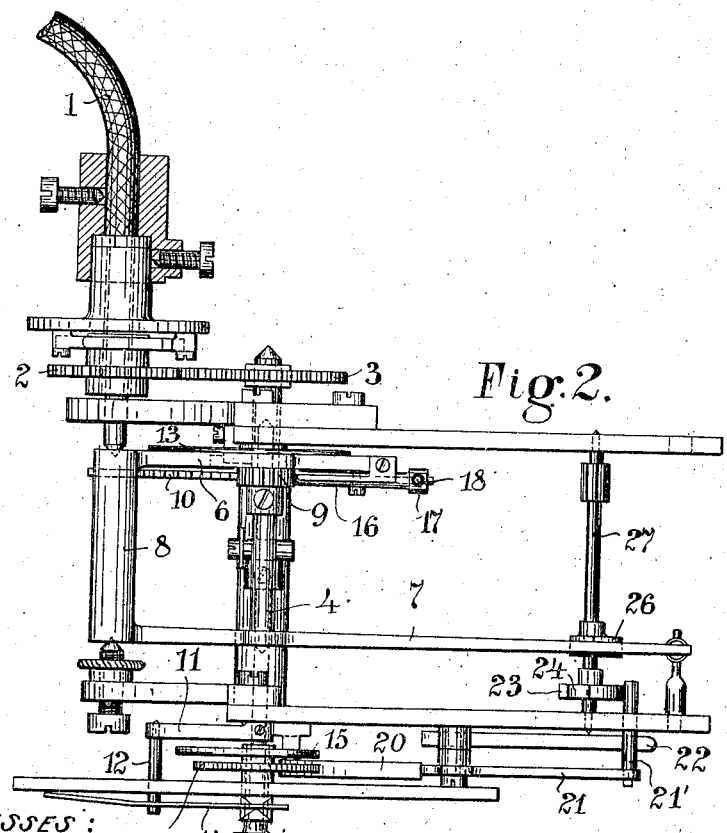

The apparatus according to this invention is illustrated in the accompanying drawing in Figure 1 in front elevation and in Fig. 2 in plan, the wheel gear and the balance, together with levers, being left out for the sake of clearness, or indicated only to such extent as necessary for understanding the drawing. Similarly in Fig. 1 the front plate of the clockwork is not shown, Figs. 3, 4, 5 and 6 show four characteristic positions of the indicator apparatus in connection with the cams bringing about the coupling or uncoupling of the drive and the release of the indicator device, and Figs. 7 and 8 are detail views.

The flexible spindle 1 connected to the axle of the vehicle, drives a toothed wheel 2 engaging with a toothed wheel 3. The spindle 4 of the latter is supported by means of a system of levers, the two arms 6 and 7 of which are mounted on a spindle 8 supported between points. On the spindle 4 is further mounted a toothed wheel 9 which, when the lever system 6 7 and the spindle 4 are suitably turned, can come into engagement with another toothed wheel 10, the spindle of which is provided with a lever arm 11 and driver pin or tappet 12. A spiral spring 13 always has the tendency to bring the toothed wheel 10 and the lever 11 into the zero position shown in Figs. 1 and 2. The driver pin 12 projects forward to such an extent that it can drive an index 14 moving along a scale, a spring 15 having the tendency to always bring back the said index to its zero position. In order to shift the finger 14 in accordance with the speed by the turning of the arm 11 and of the toothed wheel 10, the toothed wheel 9 is brought intermittently into engagement with the toothed wheel 10 by turning the lever system 6 7. As the toothed wheel 9 is driven during the movement of the vehicle by the spindle 1 and the toothed wheels 2 and 3, in accordance with the speed of the vehicle, the toothed wheel 10, during the engagement with the toothed wheel 9 which lasts only a short time, will also be turned to a certain extent by the toothed wheel 9, and the said turning or rotation will be communicated by the arm 11 and the pin 12 to the index 14. A pawl 16 engaging with the toothed wheel 10 and mounted on the lever arm 6, holds thereupon the indicator device during a certain time in that position. The index of the apparatus is thus set to the speed which the vehicle had at that moment. In order, however, to ascertain the speed at the next following moments, the operation of the apparatus must be started afresh, and thus the toothed wheel 10 with the lever arm 11 again brought to the zero position. This release of the toothed wheel 10 with the lever 11 is effected by a corresponding movement of the lever arm 7, which also brings the toothed wheels 9 and 10 into or out of engagement with each other. For bringing the toothed wheels 9 and 10 into engagement, the lever arm 7, is lowered, and for disengaging them, slightly raised. During further ascent of the lever 7, the pawl 16 is brought out of engagement with the toothed wheel 10, the free end 17 of the said pawl striking the stop pin 18 and raising the pawl 16 out of the teeth of the wheel 10. The wheel 10 springs then back into its zero position under the influence of the action of the spring 13. The index 14 would also return again to the zero position, but the time during which the index would remain set, would be too short for reading the indication of the apparatus, and would require an excessive attention of the driver which would distract him from his proper duties.

In order to prevent the instantaneous swinging back of the index 14, there is provided a pawl 20 engaging with a ratchet wheel 19 secured to the index 14. The said pawl 20 is mounted on a double armed lever 21, the free end of which, provided with a transverse pin 21', is pressed by a spring 22 against a cam disk 23 mounted on a spindle 27, the said cam disk 23 being provided with a recess 24. As soon as the pin 21', at the rotation of the spindle 27 driven by the clockwork, engages with the said recess 24, the pawl 20 is disengaged from the ratchet wheel 19, and the index 14 can freely spring back under the action of the spring 15.

The movement of the lever system 6, 7 for coupling and uncoupling the toothed wheels 9 and 10, as well as for releasing the toothed wheel 10 from the pawl 16, is effected by a cam disk 26 also mounted on the spindle 27, on which cam slides a finger 25 mounted on the lever arm 7. The cam disk 26 is provided with three different tracks or races.

When the finger 25 is resting on the last track of the cam disk 26, the toothed wheel 9 is in engagement with the wheel 10 (see Figs. 1 and 3).

The toothed wheel 10 is driven from the flexible spindle 1 by means of toothed wheels 2 and 3 and toothed wheels 9, and the driving lasts each time as long as the finger or projection 25 is on the lowest track of the cam disk 26. The index is during that time driven by a pin 12 in the direction of the arrow 28 and is held in its position by the pawl 20 (Fig. 3). When during further rotation of the spindle 27 the projection 25 comes on the next highest track of the cam disk 26, then owing to the raising of the lever arm 7, the toothed wheel 9 is brought out of engagement with the toothed wheel 10 (Fig. 4). The toothed wheel 10 on the lever 11 remains, however in that position as long as the projection 25 is sliding on this second highest track of the cam disk. This short period of rest of the arm 11 and of the pin 12 is necessary because, with the decreasing speed, the index 14 would be first on a higher division of the scale of speed, and on being released would spring back until it reaches the stop pin 12. When therefore, the position of the lever 7 and of the cam disk 26 shown in Fig. 4 is reached, the index 14 must be released as shown in Fig. 5. At that moment the pin 21' mounted on the lever 21, engages with the recess 24 of the cam disk 23, and the pawl 20 releases the ratchet wheel 19.

When the index is on a higher division of the scale, as shown dotted in Fig. 5, it will spring back under the action of the spring 15 in the direction of the arrow 29, until it strikes the stop pin 12 which in the meantime has been brought again, by the movement of the toothed wheel 10, from the zero point to the position corresponding to the speed at the time, whereupon, during further rotation of the cam disk 23, the pin 21' again comes out of the recess 24 and brings the pawl 20 into engagement with the ratchet wheel 19. When, therefore, the index 14 has reached that position of the scale corresponding to the speed of the vehicle, the activity of the lever 11 for setting the index is terminated, and the lever can return to its zero position. During further rotation of the spindle 27, the projection 25 of the lever arm 7 comes to the highest track of the cam disk 26, whereby the arm 17 of the pawl 16 is caused to strike the stop pin 18 and lifts the pawl 16 out of engagement with the toothed wheel 10, so that the latter, as well as the lever arm 11, can swing back into the zero position in the direction shown by the arrow 30 (Fig. 6). After the toothed wheel 10 and the arm 11 have been brought into the zero position, the described operation can begin afresh, the projection 25 of the lever 7 coming again as shown in the position in Fig. 3, on to the lowest track of the cam disk 26 and bringing about the engagement of the toothed wheels 9 and 10, and so on.

A springing back of the index 14 in the position of the parts shown in Fig. 5 takes place only when the speed is decreasing, that is to say, when the stop pin 12 of the lever arm 11 does not reach the previous position of the index 14. If, however, speed remains the same or is increasing, the pin 12 will reach the index 14, or drive the index farther to a higher division on the scale of speed. It follows, therefore, that when the apparatus is working, the index 14 receives constantly, at very short intervals of time, different fixed positions on the scale of speed, the said positions depending on the speed of the vehicle. The time of each shifting or setting depends on the speed with which the spindle 27 carrying the cam disks 23 and 26 is driven. The time occupied by one revolution of the said spindle can for instance advantageously occupy two seconds, so that the index 14 is set again every two seconds, which time interval is sufficient for practical purposes, as the alterations of speed within that time in a vehicle can never be of importance.

What I claim as my invention and desire to secure by Letters Patent is:

1. The combination with a rotatable member, the speed of which is to be measured, of a toothed wheel driven from the member, a lever carrying the toothed wheel, a second toothed wheel, an index operated by the last named toothed wheel, a clock work, means for operating the lever from the clock work to move the first gear wheel in and out of mesh with the second gear wheel, means for locking the second gear wheel in the position it has been moved, and means for releasing the locking means to permit the said wheel to return to zero position.

2. The combination with a rotatable member, the speed of which is to be measured, of a toothed wheel driven from the member, a lever carrying the toothed wheel, a second toothed wheel, an index operated by the last named toothed wheel, a clock work, means for operating the lever from the clock work to move the first named gear wheel in and out of mesh with the second gear wheel, a pawl and ratchet mechanism for locking the second gear wheel in the position to which it has been moved, and a cam disk operated by the clock work for disengaging the pawl from its ratchet wheel.

3. In a speedometer, a lever provided with a projection, a toothed wheel mounted in the lever, means for operating the toothed wheel from the part, the speed of which is to be measured, a second toothed wheel, an index operated by the second toothed wheel, a pawl carried by the lever for engaging the said second toothed wheel, a stop with which the pawl engages, and a continuously driven cam disk provided with three tracks, whereby the first toothed wheel will be moved in and out of mesh with the second toothed wheel and the pawl disengaged from the said second toothed wheel.

4. In a speedometer, a double armed lever, a toothed wheel mounted in one arm of the lever, means for operating the toothed wheel from the part, the speed of which is to be measured, a second toothed wheel, an index operated by the second toothed wheel, a pawl caried by the other arm of the lever and engaging the second toothed wheel, a stop with which the pawl engages, and a cam disk provided with three tracks and with which one of the arms of the said lever engages.

5. In a speedometer, a toothed wheel, means for operating the toothed wheel from the part, the speed of which is to be measured, a second toothed wheel, an index operated by the last named toothed wheel, means for alternately throwing the first named toothed wheel in and out of mesh with the second toothed wheel, a ratchet wheel on the shaft of the second toothed wheel, a pawl engaging the ratchet wheel, and a continuously driven cam disk provided with a recess and with which the pawl engages.

6. In a speedometer, a wheel spring actuated in one direction, means for operating the wheel in a direction opposite to that of the spring, from the part, the speed of which is to be measured, means for disengaging the operating means and releasing said wheel to permit it to be returned to zero position by its spring, an index, means for operating the index from said wheel, a spring for returning the index to zero position, a ratchet wheel to which the index is secured, a spring pressed pawl for engaging the ratchet wheel, said pawl being pivoted intermediate of its ends, and a recessed cam with which one end of said pawl engages, said cam serving to hold the pawl in engagement with the ratchet wheel until the pawl enters the recess when the pawl will be disengaged from the ratchet wheel.

In testimony whereof I have signed my name to this specification in the presence of two subscribing witnesses.

ERNEST SCHNEIDER.

Witnesses:
WENZEL SINKE,
AUGUST FUGGER.